March 12, 1935.  C. L. OTT  1,993,854
CAM GRINDING APPARATUS
Filed July 11, 1931   2 Sheets-Sheet 1
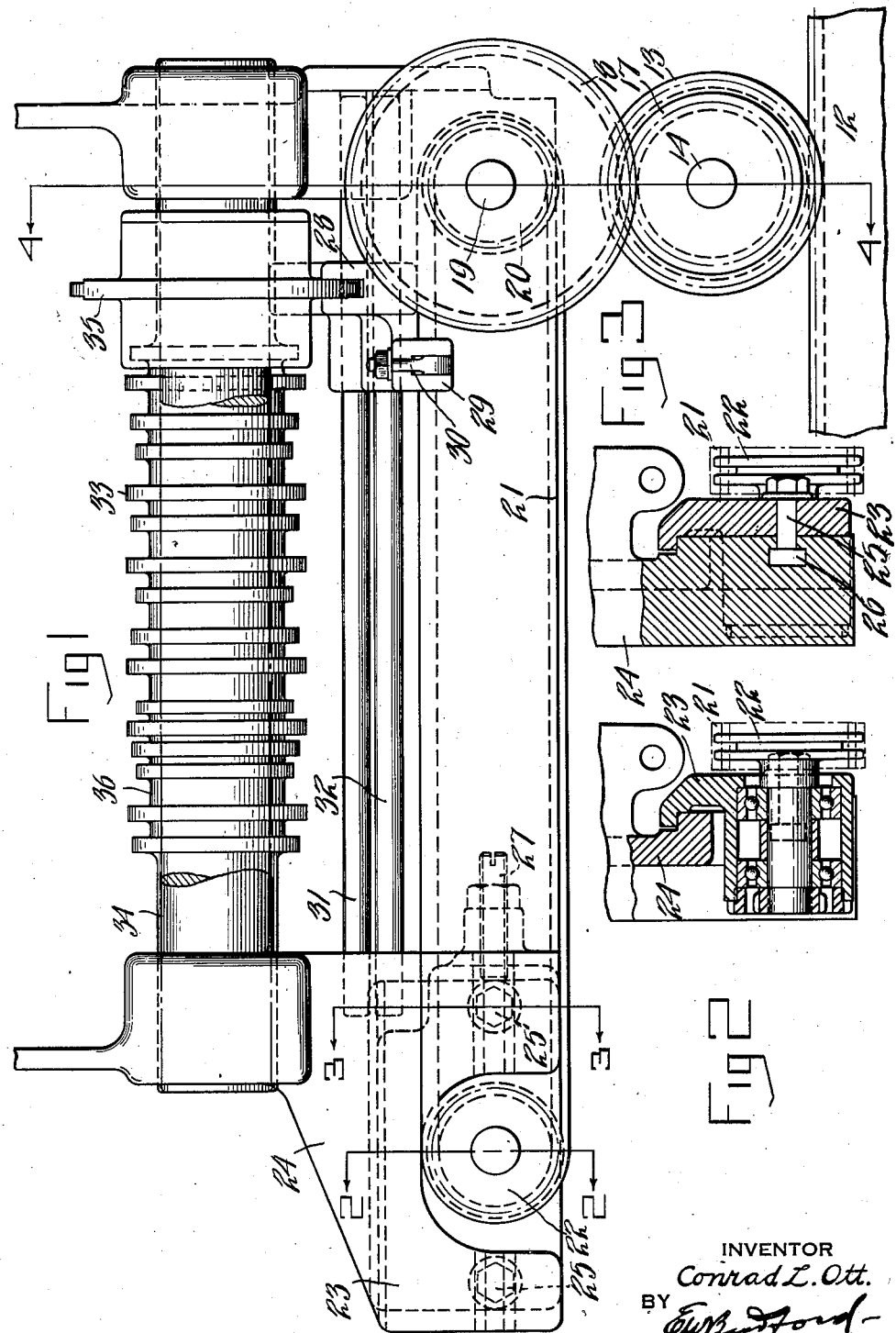
INVENTOR
Conrad L. Ott.
BY
ATTORNEY

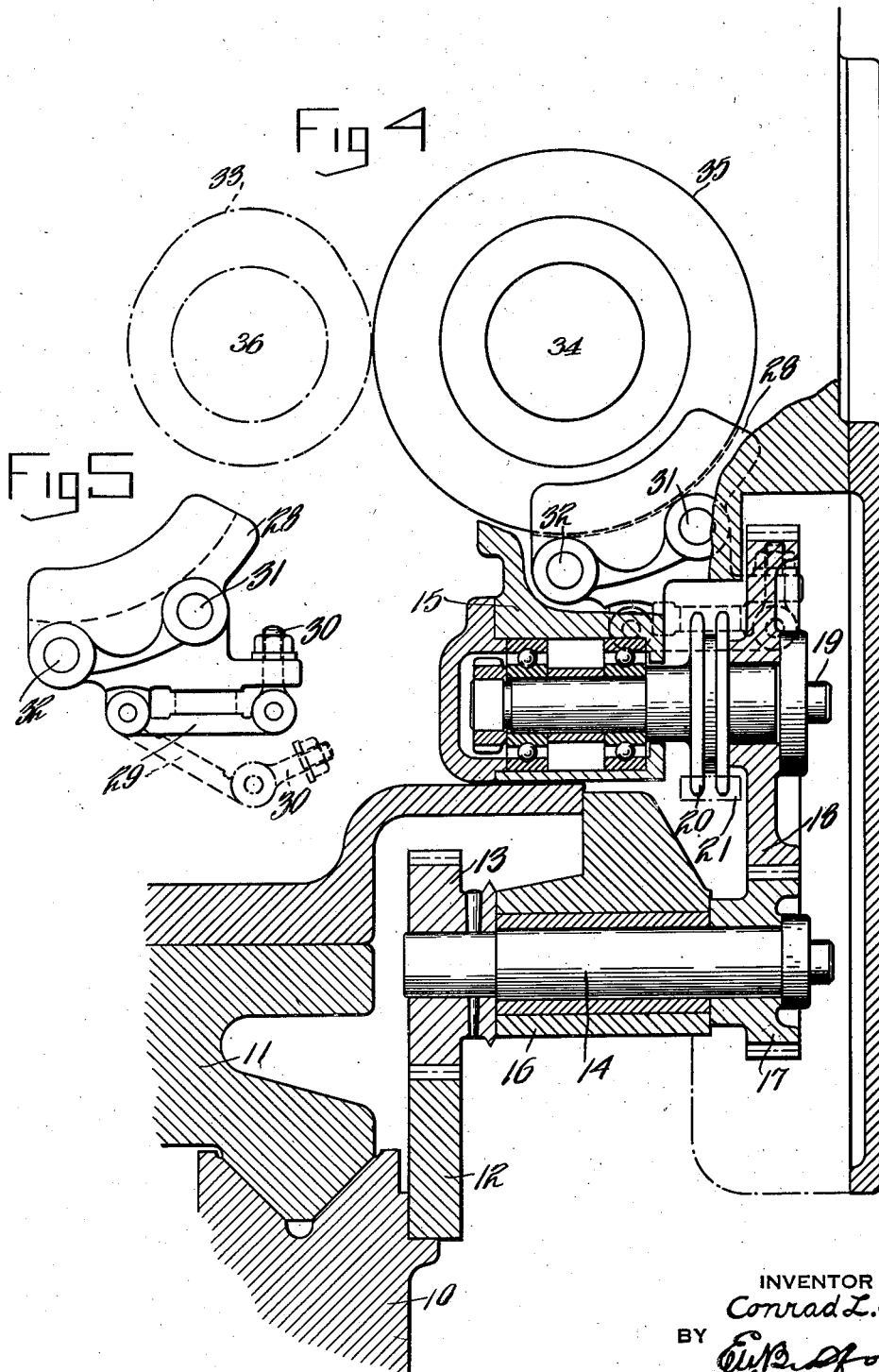

Patented Mar. 12, 1935

1,993,854

UNITED STATES PATENT OFFICE 1,993,854

CAM GRINDING APPARATUS

Conrad L. Ott, Waynesboro, Pa., assignor to Landis Tool Company, Waynesboro, Pa., a corporation of Pennsylvania Application July 11, 1931, Serial No. 550,231

3 Claims. (Cl. 51—101)

This invention relates to cam grinding machines and particularly to means for shifting a cam follower from one master cam to another.

The object of the invention is to provide means for this purpose which will operate with the minimum of friction.

A further object is to provide cam follower operating mechanism so arranged as to be readily enclosed by the head stock casing.

A still further object is to provide adjusting mechanism to insure that the parts move in perfect synchronism.

Referring to the accompanying drawings, which are made a part hereof and on which similar reference characters indicate similar parts, Figure 1 is a rear view of the head stock or master cam assembly, Figure 2, a section on line 2—2 of Figure 1, Figure 3, a section on line 3—3 of Figure 1, Figure 4, a section on line 4—4 of Figure 1, and Figure 5, a detail end view of the yoke for the master cam follower and means for attaching the same to a driving chain.

Devices heretofore used for moving cam followers have consisted of rack and pinion mechanism or of a lead screw driven by the traverse carriage through a system of gears. Where rack mechanism was used the rack which shifted the roller in order to obtain sufficient range was so long that it extended for some distance outside of the housing and for this reason it was difficult to protect it against water and abrasive material. In devices in which a lead screw is used the friction is very high and hence it requires a larger amount of power to operate the follower through this mechanism, moreover although a lead screw does not take up much space, it is relatively more expensive and requires expensive mechanism to operate it. In my device the cam follower is operated by means of a chain and sprocket drive and receives its motion from the movement of the work carriage. In this latter respect it resembles the type of mechanism having a rack and pinion.

In the drawings numeral 10 indicates the bed of a machine having a traverse carriage 11 slidably mounted thereon. A rack 12 is secured upon the bed 10. A pinion 13 meshes with the rack 12. This pinion is mounted on the end of a shaft 14 carried by a bracket 16, which is attached to the carriage 11, the inner end of the shaft 14 having a pinion 17 thereon which meshes with a gear 18 on the end of a shaft 19. The shaft is mounted in suitable ball bearings in a bracket 15 which is also attached to carriage 11. The shaft 19 carries a sprocket wheel 20 over which passes one end of a sprocket chain 21, the other end of the sprocket chain passing around the sprocket wheel 22. The sprocket wheel 22 is provided with adjusting means to keep the sprocket chain under proper tension. The sprocket wheel 22 is mounted in a hanger 23. This hanger is secured to the frame 24 by means of bolts 25 which have T-shaped heads which fit in T-slots 26 in the frame 24. A set screw 27 passes through the end of the hanger 30 and engages a portion of the frame 24 to provide for adjustment of the sprocket 22. From the construction so far given it will be apparent that any traverse movement of the carriage 11 will cause the sprocket chain 21 to travel about the sprockets 20 and 22. A cam follower 35 is rotatably mounted on shaft 34 and moved by a bracket 28 which is slidably mounted on rods 31 and 32 which are secured in the frame 24. This bracket is secured to the sprocket chain by means of a latch 29. A bolt 30 is pivoted to the end of the latch and is movable to engage the outer end of the bracket 28 and to clamp a link of the sprocket chain between the latch 29 and the bracket 28 and in this manner serves to hold the cam follower in position on the sprocket chain. The cam follower 35 is thus movable to position it adjacent any one of a number of master cams 33 on the master cam shaft 36. As the carriage 11 is moved transversely gear 13, which is meshed in rack 12, rotates, in turn driving through shaft 14, gears 17, 18, sprocket 20 and chain 21, thereby shifting the cam follower laterally of the master cams 33. The ratio of the gears 13, 17, 18 and the sprocket 20 is such as to insure proper timed movement of the cam follower 35 with the movement of the carriage 11. The ratio of the gears is such that the full travel of the carriage causes the cam follower to shift from one end of the master cam shaft 36 to the other. The master cam is carried on a horizontally pivoted cradle and is rocked away from the cam follower when said follower is to be shifted to another position, a yielding means holding the master cam in contact with the cam follower. For a more complete disclosure of a complete machine to which my invention may be applied reference may be had to a copending application of Amos P. Steiner, et al Ser. No. 384,068, filed August 7, 1929 for Cam grinding machines. The present application provides improvements in shifting the cam follower roll to position it opposite the master cam on the master cam shaft. From the construction defined it will be seen that the operating mechanism for the cam follower is all compactly arranged on the headstock so that a single headstock cover is sufficient to enclose all moving parts of the device and thus prevent injury to these parts by the water from the grinding wheel or by abrasive material from the cutting action of the wheel on the work.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A machine of the kind described having a traversing carriage, a master cam shaft, a cam follower movable in a path parallel to the axis of said shaft, means for shifting said follower, comprising an endless belt attached thereto, and connections between said belt and said carriage whereby said follower is moved by movement of said carriage.

2. In a machine of the kind described, a master cam shaft, a cam follower movable in a path parallel to said shaft, means to move said follower comprising a chain belt, means attached to said belt adapted to engage and shift said follower, supporting and driving means for said chain belt comprising a pair of sprockets, means to drive one of said sprockets, said sprockets being spaced so that the shortest distance between their peripheral surfaces is equal approximately to the maximum movement of said follower.

3. In a machine of the kind described a master cam shaft, a follower movable in a path parallel to said shaft, means to move said follower comprising a chain belt, means attached to said belt adapted to engage and shift said follower, supporting and driving means for said chain belt comprising a pair of sprockets, means to drive one of said sprockets, the spacing between said sprockets being just sufficient to permit movement of said follower between the end cams on the said master cam shaft.

CONRAD L. OTT.